United States Patent [19]

Sonnefeld et al.

[11] 3,755,239

[45] Aug. 28, 1973

[54] DISPERSANTS FOR DISSOLUTION OF ELASTOMERS IN SOLVENTS

[75] Inventors: Richard J. Sonnefeld; Carl A. Uraneck; Edward J. Kosinsky, all of Bartlesville, Okla.

[73] Assignee: Phillips Petroleum Company, Bartlesville, Okla.

[22] Filed: May 24, 1971

[21] Appl. No.: 146,457

[52] U.S. Cl. 260/33.6 A, 260/31.2 MR, 260/32.4 R, 260/33.8 UA, 260/34.2 R, 260/760 R, 260/879 R, 260/880 R
[51] Int. Cl. ...................................... C08f 45/38
[58] Field of Search .................. 260/33.6 A, 880 R, 260/31.2 MR, 32.4, 33.8 UA

[56] References Cited
UNITED STATES PATENTS

| 2,683,127 | 7/1954 | Griess | 260/880 R |
|---|---|---|---|
| 3,381,022 | 4/1968 | LeSuer | 260/479 S |
| 2,606,163 | 8/1952 | Morris et al. | 260/880 R |

Primary Examiner—Morris Liebman
Assistant Examiner—J. H. Derrington
Attorney—Young and Quigg

[57] ABSTRACT

A method of facilitating the dissolution of an elastomer in an organic solvent by employing as a dispersant a compound having the general formula

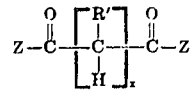

wherein $x$ is an integer from 1 to 10, $R'$ is one of hydrogen and a substantially hydrocarbon radical containing at least 50 aliphatic carbon atoms, Z is selected from the group consisting of OH, OM and OR'', R'' being derived from a mono- or polyhydric alcohol, and M is a monovalent alkali metal or divalent alkaline earth metal.

7 Claims, No Drawings

DISPERSANTS FOR DISSOLUTION OF ELASTOMERS IN SOLVENTS

This invention relates to dispersants which facilitate the dissolution of elastomers in solvents.

In one of its more specific aspects, this invention relates to a method of facilitating the dissolution of elastomers in organic solvents.

For certain purposes, it is desirable to dissolve various elastomers in various organic solvents. Usually the elastomer is introduced into the solvent in particulate form, dissolved, and the solution is thereafter chemically reacted to incorporate the elastomer in the reaction product. One typical example of this procedure involves the dissolution of polybutadiene rubber in styrene and the polymerization of the rubber-containing styrene monomer to form high impact polystyrene containing the elastomer. Usually dissolution difficulties manifest themselves by the appearance of the elastomers as agglomerates within the solvent, these agglomerates subsequently plugging transfer lines, pumps and the like. Such difficulties are frequently magnified in that upon the formation of the solution of the elastomer in the solvent, the solution viscosity increases appreciably.

There has now been discovered a method of facilitating the dissolution of elastomers in organic solvents which comprises introducing into said solvent during the dissolution of said elastomer a compound of the general formula

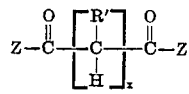

as hereinafter defined.

The aforementioned designated compound can be introduced prior to, simultaneously with, or after contact is made between the solvent and the elastomer. It can be introduced in the amount hereinafter specified in a single introduction or in aliquots.

In general, the method of this invention is applicable to rubbery polymers including emulsion or solution polymerized butadiene/styrene copolymers, emulsion or solution polymerized polybutadienes, natural rubber, cis-polyisoprene, isobutylene/diene copolymers, and ethylene/propylene/diene terpolymers, and the like. The method of this invention is also applicable to mixtures of the aforementioned elastomers.

The method of this invention can be employed to facilitate the dissolution of elastomers in a wide variety of organic solvents. Generally, the method is employed using polymerizable vinyl monomers as the solvent. These monomers include the vinyl-substituted aromatic compounds such as styrene, 4-methylstyrene, α-methylstyrene, 4-t-butylstyrene, p-chlorostyrene, 3-methyl-styrene, 1-vinylnaphthalene and the like. Other organic solvents of the polymerizable type include the α,β-unsaturated nitriles, and acrylate and alkacrylate esters. Mixtures of the above solvents can also be employed.

The dispersants which are employable in the method of this invention are of the general formula

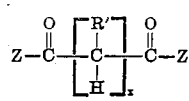

wherein $x$ is an integer having a value within the range of from 1 to 10 wherein R' is one of hydrogen and a substantially hydrocarbon radical containing at least 50 aliphatic carbon atoms; and wherein one, but only one, R' is said substantially hydrocarbon radical; in which formula Z is selected from the group consisting of OH, OM and OR'', at least one Z is OR'', M being a monovalent alkali metal or divalent alkaline earth metal, R'' being derived from a mono- or polyhydric alcohol containing up to about 40 aliphatic carbon atoms; in which formula, when M is a divalent metal, the remaining free valence of M is attached to another ester molecule of the above type through a carboxyl group and wherein the remaining uncombined hydroxyl groups of the polyhydric alcohol can be "free" or combined with another ester molecule of the type

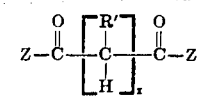

through a carboxyl group. Mixtures of these esters can be employed and esters in admixture with up to about 15 percent of other materials such as other types of dispersing agents can also be employed.

Materials of the general nature of those described above are disclosed in U.S. Pat. No. 3,381,022 to LeSuer and are commercially available in the form of Lubrizol 934 from the Lubrizol Corporation, Wickliffe, Ohio.

The dispersants defined are employed in amounts within the range of from about 0.001 to about 1 part by weight per 100 parts by weight of the elastomer which is to be dissolved in the monomer. Particularly good results are obtained when the dispersant is employed in an amount within the range of from about 0.0025 to about 0.1 part per 100 parts by weight of the elastomer.

The following examples will illustrate the effectiveness of the dispersants of this invention in facilitating elastomeric dissolution in solvents.

EXAMPLE I

Solution-polymerized polybutadiene, in particulate form, was introduced into styrene under agitation. In each run, the styrene was stirred with a stirrer positioned centrally of the tank, and identical quantities of the polybutadiene were added in four individual additions made at about five minute intervals. In all instances, the runs were conducted under substantially identical conditions except in respect to the dispersant which was present in the styrene. In Run No. 1, no dispersant was employed. There was no agglomeration after the first addition of the polybutadiene. After the second addition a floating ring of agglomerated rubber granules formed around the stirrer; this ring persisted through the third addition, and after the fourth addition, large agglomerations of elastomeric granules were still present.

In Run No. 2, a commercially available dispersant was added. This dispersant consisted essentially of a mixture of a polyisobutenyl succinimide and succinamide derived from polyisobutenyl succinic anhydride and alkylene polyamides wherein the polyisobutyl group was derived from a polyisobutylene having a molecular wieght in the range of 700 to 1,500 with an average of about 1,000. This dispersant, which is not the dispersant of this invention, as mixed into the styrene in an amount of about 0.045 part by weight per 100 parts by weight of the polybutadiene which was subsequently introduced. There was no agglomeration after the first addition of the polybutadiene. However, with the second and subsequent additions, a ring and lumps of rubber formed in the styrene in a manner similar to Run No. 1.

In Run No. 3, the material of this invention, a mixture comprising about 90 weight percent of a polyisobutenyl succinic ester, wherein the polyisobutyl group is as described relative to that material introduced into Run No. 2, and about 10 weight percent of that material introduced into Run No. 2 was employed. This mixture was employed in an amount of about 0.046 part by weight of the polybutadiene which was subsequently added. While a ring of rubber formed around the stirrer after the second addition of the polybutadiene and persisted during the course of the run, no lumps of rubber formed in the solution.

These data indicated the operability of the method of this invention in facilitating the dissolution of an elastomer in an organic solvent.

EXAMPLE II

That dispersant employed in Run No. 3 of Example I was milled into a polybutadiene in an amount of 0.01 part by weight per 100 parts of the polybutadiene. The rubber was granulated and introduced into styrene in the manner of Example I. After three additions, the results were comparable to those of Run No. 3 of Example I. Through an additional nine additions of elastomer, no lumps formed which persisted in the solution.

This run indicates that the method of this invention can be carried out by incorporating the dispersant in the elastomer to be dispersed.

EXAMPLE III

Runs conducted under conditions substantially identical to those of Example I, but employing polybutadiene in particles up to about one-quarter inch in dimension and incorporating 0.005 part of the dispersant of Run 3, Example I, in this instance, the dispersant having been incorporated in the polybutadiene by mixing the additive with the hydrocarbon solution of the polybutadiene and steam stripping the solution to recover the dispersant-containing butadiene.

Results were substantially as previously demonstrated, that is, after twelve polybutadiene additions, no lumps persisted in the solution.

This run indicates that the method of this invention can be carried out by incorporating the dispersant in the elastomer prior to the recovery of the elastomer in its solid form, that is, just after the formation of the elastomer.

EXAMPLE IV

Runs, conducted under the conditions of Example III, in which dispersant was incorporated in the elastomer in amounts of about 0.012 and 0.05 part per hundred parts of polymer gave satisfactory results.

It would be concluded from the above that the dispersant can be incorporated into the solution in the recited amounts in any suitable manner including direct addition to the solvent or by incorporation in the polybutadiene just after its production. Relatedly, incremental addition of the dispersant to the solution is satisfactory.

It will be evident that various modifications can be made to the method of this invention. However, such modifications are to be considered as being within the scope of the invention.

What is claimed is:

1. A method of forming a solution of an elastomer in a solvent wherein said solvent is a polymerizable vinyl monomer and wherein said elastomer is selected from the group consisting of emulsion or solution polymerized butadiene/styrene copolymers, emulsion or solution polymerized polybutadiene, natural rubber, cis-polyisoprene, isobutylene/diene copolymers and ethylene/propylene/diene terpolymers which comprises introducing into contact with said elastomer and said solvent a substance having the formula

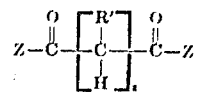

in which $x$ is an integer of from 1 to 10; $R'$ is one of hydrogen and a substantially hydrocarbon radical containing at least 50 aliphatic carbon atoms; and in which one and only one $R'$ is said substantially hydrocarbon radical; $Z$ is selected from the group consisting of OH, OM and OR'', of which at least one $Z$ is OR'', M is a monovalent alkali metal or divalent alkaline earth metal, and $R''$ is derived from a mono- or polyhydric alcohol containing up to about 40 aliphatic carbon atoms and dissolving said elastomer in said solvent.

2. The method of claim 1 in which said substance is introduced into said contact an amount within the range of from about 0.001 to about 1 part by weight per 100 parts by weight of said elastomer.

3. The method of claim 1 in which said substance is introduced into said solvent.

4. The method of claim 1 in which said substance is incorporated in said elastomer to form a composite and said composite is introduced into contact with said solvent.

5. The method of claim 1 in which said elastomer is polybutadiene and said solvent is styrene.

6. The method of claim 1 in which said solvent is a monomer selected from the group consisting of polymerizable vinyl-substituted aromatic compounds, α,β-unsaturated nitriles, acrylate esters, alkacrylate esters and mixtures thereof.

7. The method of claim 4 in which said substance is introduced into said elastomer during the formation of said elastomer.

* * * * *